July 7, 1953 J. B. GEHMAN 2,644,892

TRANSISTOR PULSE MEMORY CIRCUITS

Filed June 2, 1952

INVENTOR
John B. Gehman
BY H. L. Newton
ATTORNEY

Patented July 7, 1953 2,644,892

UNITED STATES PATENT OFFICE 2,644,892

TRANSISTOR PULSE MEMORY CIRCUITS

John B. Gehman, Haddonfield, N. J., assignor to Radio Corporation of America, a corporation of Delaware Application June 2, 1952, Serial No. 291,176

15 Claims. (Cl. 307—88)

This invention relates generally to memory circuits, and particularly relates to a system utilizing a current multiplication transistor for storing an electrical pulse and determining within a predetermined interval of time whether a pulse has previously been stored or not.

Memory circuits find wide application, for example, in many types of electronic computors. Thus some computors require means for storing information which will later be referred to by the computor to complete a calculation. In some types of computors memory is provided by means of a magnetic tape which stores the desired information. Frequently, it is necessary to obtain a plurality of pulses simultaneously from the magnetic tape, each pulse representing information. These pulses usually must be fed simultaneously to the computor. However, the magnetic tape may become mechanically stretched or askew or it may not be feasible to derive or pick up all the pulses simultaneously from the tape. In that case, an additional memory circuit may be required into which the various pulses derived from the tape are fed in succession for temporary storage and from which they may be derived at will simultaneously.

It is an object of the present invention, therefore, to provide pulse memory circuits utilizing transistors.

Another object of the invention is to provide a transistor circuit which will indicate whether or not a pulse has previously been applied to the circuit within a predetermined relatively long interval of time.

A further object of the invention is to provide a memory circuit including a current multiplication transistor which will develop an output pulse of predetermined fixed amplitude in response to an interrogating pulse when an input pulse has previously been applied within a predetermined interval of time to the circuit.

Still another object of the invention is to provide a memory circuit of the type previously referred to which might be termed an inhibited circuit and which will develop an output pulse of a relatively small amplitude in response to an interrogating pulse occurring within a predetermined interval of time after the occurrence of an input pulse.

The pulse memory circuit of the present invention may be considered an improvement over the "semi-conductor pulse memory circuits" disclosed and claimed in applicant's copending application filed concurrently herewith, Serial No. 219,177, and assigned to the assignee of this application. However, the pulse memory circuit of the present invention provides a memory time which is several hundred times as long as that of the memory circuit disclosed in the copending application.

The pulse memory circuit of the present invention comprises a current multiplication transistor, that is, a transistor having a ratio of short-circuit collector current increments to emitter current increments which is greater than unity. Such a current multiplication transistor may be connected in a network in such a manner that the circuit is normally not regenerative but is brought or carried into the regenerative state by the application of an input pulse to the circuit. The circuit then remains in its regenerative state for a predetermined extended period of time. Hence, if an interrogating pulse is applied to the circuit within that interval of time, an output pulse of relatively large amplitude is obtained.

It is also feasible to operate the circuit of the invention in such a manner that the circuit is normally in its regenerative state and is carried out of the regenerative state by the application of an input pulse for a predetermined interval of time. Such a circuit might be called an inhibited circuit because it inhibits the development of a large output pulse in response to an interrogating pulse occurring within a predetermined interval of time after the occurrence of the input pulse.

The transistor of the present invention is provided with an impedance element which effectively couples the emitter and collector electrodes. If such a circuit is energized in a conventional manner, a bistable or flip-flop circuit will result. Such bistable circuits have been disclosed and claimed in the patent to Eberhard 2,533,001. The impedance element which couples the emitter and collector may either be provided between the base and ground or it may connect directly the emitter to the collector.

In accordance with the present invention, it is not necessary to apply any bias potential to the transistor. Instead, input pulses are applied between emitter and base which may, for example, bias emitter and base in the forward direction. If we assume that the semi-conducting body or crystal of the transistor is of the N type, the input pulse may develop a voltage of positive polarity which will inject holes into the crystal through the emitter. However, if the transistor should include a crystal of the P type, the pulses applied to the emitter may develop a voltage of negative polarity which will inject electrons into the crystal.

In accordance with the present invention, these pulses are applied through a transformer or inductor which preferably is a wide band transformer. Assuming again that the transistor includes an N type crystal, a large negative pulse may be impressed on the transformer. Upon the occurrence of the trailing edge of the input pulse the transformer will develop a small positive potential which will exist for an appreciable period of time. During the existence of this positive potential, the transistor network is rendered regenerative and will develop a large output pulse in response to an interrogating pulse applied between collector and base.

Alternatively, for providing an inhibited circuit the transistor is adjusted to be normally in the regenerative state and a large positive pulse is applied to the input transformer. Consequently, upon the occurrence of the trailing edge of the pulse, a small negative potential will be developed across the transformer which carries the transistor network out of the regenerative state as long as the negative voltage exists at the emitter. Consequently, if an interrogating pulse is applied to the collector during a predetermined interval of time after the occurrence of the trailing edge of the input pulse, a relatively small output pulse only is developed across the collector load.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
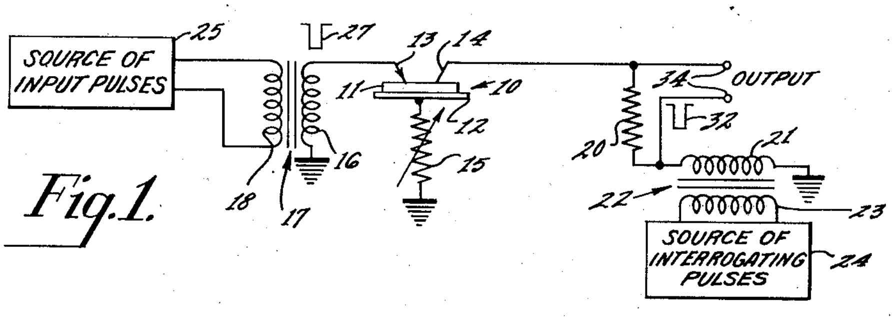
Figure 1 is a circuit diagram of a pulse memory circuit embodying the present invention.

Referring now to the drawing in which like elements are designated by the same reference numerals throughout the figures and particularly to Figure 1, there is illustrated a pulse memory circuit comprising a transistor 10 indicated schematically. The transistor 10 includes a semi-conducting body 11, a base electrode 12, an emitter electrode 13 and a collector electrode 14 in contact with the semi-conducting body or crystal 11. The transistor 10 may be of the point contact type, that is, emitter 13 and collector 14 may be in rectifying contact with the crystal 11. However, in any case, the transistor 10 should be a current multiplication transistor where the collector current increments are larger than the corresponding emitter current increments.

An external network interconnects the electrodes 12—14 of the transistor with a common junction point such as ground. Thus, the base 12 may be grounded through a base resistor 15 which may be adjustable as shown. Emitter 13 is grounded through the winding 16 of input transformer 17 having a primary winding 18. Collector 14 may be grounded through an output load resistor 20 connected in series with the secondary winding 21 of a transformer 22 including a primary winding 23. By means of the transformer 22 interrogating pulses obtained from source 24 are applied to the transistor as will be more fully explained hereinafter.

Input pulses developed by source 25 are impressed on the primary winding 18 of input transformer 17 in a manner which will be more fully discussed hereinafter.

It will be noted that no sources of direct current voltages are shown nor are any required for the memory circuit of the invention. It will also be noted that no capacitors are provided for storing direct current voltages. If the transistor network described so far were operated in the conventional manner by applying a forward bias voltage to the emitter 13 and a reverse bias voltage to the collector 14 with respect to the base 12, a regenerative amplifier or bistable circuit would be obtained. Such a circuit has been disclosed in Figure 3 of the Eberhard patent previously referred to.

In accordance with the present invention, input pulses indicated at 27 and derived from source 25 are impressed between emitter 13 and base 12 through input transformer 17. The input pulse 27 as impressed on emitter 13 is of negative polarity and biases the emitter 13 and base 12 in the reverse direction provided the crystal 11 is of the N type as indicated by the transistor symbol. The arrow representing emitter 13 points toward crystal 11 to indicate that holes are injected into an N type crystal; if the arrow representing the emitter points away from the crystal 11, a P type crystal is indicated and the holes will move from the crystal to the emitter. If the semi-conducting crystal 11 were of the P type, the polarity of the input pulses 26 should be reversed to obtain the same type of operation.

As already explained, the input pulses are developed by source 25 and impressed on the input transformer 17 so as to obtain a negative pulse 26 which is developed across secondary winding 16. The transformer 17 preferably is a wide band transformer. Accordingly, the inductive coupling between the primary winding 18 and the secondary winding 16 should be large. In other words, the leakage reactance of the transformer should be low. The inductive coupling will control the high-frequency response of the transformer. Furthermore, the inductance of both the primary winding 18 and the secondary winding 16 should be large to obtain a good low frequency response.

Figure 2:
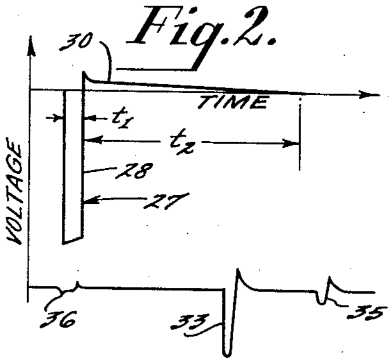
Figure 2 is a graph illustrating the input and output voltages obtained from the circuit of Figure 1 plotted as a function of time.

The voltage developed across the secondary winding 16 in response to an input pulse is illustrated by curve 27 of Figure 2. The pulse width is indicated by $t_1$ and may, for example, amount to a few microseconds. Upon the occurrence of the trailing edge of the input pulse indicated at 28, a small positive voltage indicated by curve portion 30 is developed across the secondary winding 16. For example, the amplitude of the input pulse 27 may be −50 volts and the amplitude of the positive voltage indicated at 30 may amount to +25 to 50 millivolts. The magnitude of the positive voltage represented by curve portion 30 has been exaggerated in Figure 2.

As long as the positive voltage 30 exists, that is, during the interval of time indicated at $t_2$ the circuit of Figure 1 will be in its regenerative state. During this entire interval of time, holes are injected through the emitter 13 into the crystal 11 and consequently the circuit remains in its regenerative state.

The time constant of the circuit of Figure 1, that is, of the circuit including secondary winding 16, emitter 13, base 12 and base resistor 15 is essentially determined by L/R, wherein L is the inductance of secondary winding 16 and R is the resistance which appears looking into emitter 13. More correctly $t=KL/R$, where K is a constant determined by the adjustment of the circuit will be explained hereinafter. Actually, the value of R depends upon the bias voltage, that is, whether the emitter is biased in the forward or reverse direction. Thus, the time $t_1$ is given by $KL/R_1$, where $R_1$ is the resistance which appears looking into the emitter when a reverse bias voltage is applied between emitter and base, for example, by input pulse 27. $R_1$ may be of the order of 100,000 ohms. The time $t_2=KL/R_2$, where $R_2$ is the resistance which appears looking into the emitter 13 when a voltage in the forward direction is applied between emitter and base, for example, the positive voltage 30. $R_2$ is of the order of 100 ohms and accordingly $t_2/t_1$ is approximately 1,000. By way of example, the time $t_1$ may be of the order of 5 to 7 microseconds and $t_2$ may be as large as 7,000 microseconds. Of course, the actual value of $t_2$ which is the storage time, depends upon the value of L, the inductance of secondary winding 16 and upon $R_2$ which depends upon the particular transistor. The constant K is determined by the state of regeneration of the circut, that is, how readily the circuit can be carried into the regenerative state.

As explained hereinbefore, the input transformer 17 preferably is a wide band transformer. It will now be seen that the large value of the inductance of the secondary winding 16 increases the storage time and determines the low frequency response of the transformer. On the other hand, the high magnetic coupling between primary winding 18 and secondary winding 16 which is equivalent to a low leakage reactance determines the high frequency response of the transformer and hence, makes it possible to impress a relatively narrow input pulse 27 on the transformer. The transformer 17 may be replaced by the inductor 16 on which the input pulse 27 is impressed.

Further in accordance with the present invention, the transistor memory circuit may be interrogated by means of interrogating pulses developed by the source 24 and impressed on transformer 22. As illustrated at 32 the interrogating pulses appear with negative polarity at the collector 14. During the time $t_2$ the transistor memory circuit of the invention is carried into its regenerative state by the positive voltage 30 and consequently when an interrogating pulse 32 is impressed between collector 14 and base 12, a comparatively large output pulse indicated at 33 in Figure 2 is developed across the load resistor 20. This output pulse may be obtained from output terminals 34. However, when the interrogating pulse 32 is applied to the circuit outside of the time $t_2$, a comparatively small output pulse indicated at 35 in Figure 2 is developed across the load resistor 20. The voltage kick 36 shown in Figure 2 which appears across load resistor 20 occurs in response to the applied input pulse 27 feeding through the transistor.

Thus, the positive voltage 30 developed across the secondary winding 16 of the input transformer carries the transistor into a regenerative state where it is capable of providing a large collector current in response to an interrogating pulse being applied during the predetermined interval of time $t_2$. During the time interval $t_2$ the transistor is conditioned to develop a comparatively large output pulse such as shown at 33 in response to an interrogating pulse 32. However, only a small output pulse 35 is obtained if the interrogating pulse 32 occurs at a time later than or prior to $t_2$. Hence, the pulse memory circuit of the invention is able to determine whether or not an input pulse has previously been applied thereto within a predetermined interval of time which may be of the order of 7,000 microseconds.

It is to be understood that it is also feasible to apply bias voltages to either the collector or to the emitter or to both in the conventional manner. These bias voltages, however, should be so small that the transistor normally is not in the regenerative state but can only be carried into its regenerative state by the application of an input pulse 27 which subsequently develops a positive voltage as indicated at 30. The magnitude of the bias voltages which may be applied will depend upon the individual transistor and on the resistance of the base resistor 15 which has been shown to be adjustable. The resistance of the base resistor 15 should be adjusted so that the positive voltage 30 will bring the transistor into its regenerative state and so that the transistor will remain in its regenerative state until the positive voltage 30 substantially disappears. Care should be taken by adjusting the bias voltages if any are applied, and by adjusting the resistance of base resistor 15 so that the transistor will not be in the regenerative state in the absence of an input pulse or after the predetermined time interval $t_2$ has elapsed.

Figure 3:
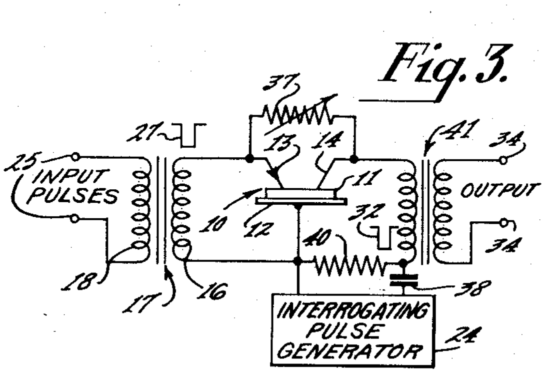
Figure 3 is a circuit diagram of a modified pulse memory circuit in accordance with the invention.

As illustrated in Figure 1 of the Eberhard patent above referred to it is also feasible to obtain a bistable transistor circuit or regenerative amplifier by connecting a resistor directly between emitter and collector. Such a regenerative transistor amplifier circuit may be utilized in the pulse memory circuit of the invention as shown in Figure 3. A resistor 37 which may be adjustable as shown, is connected directly between emitter 13 and collector 14. The input pulses are applied to the terminals 25 in the manner previously described and the secondary winding 16 of the input transformer is connected directly between emitter 13 and base 12. The interrogating pulse generator 24 may be coupled by coupling capacitor 38 across a load resistor 40 serially connected with the primary winding of an output transformer 41 between base 12 and collector 14.

The operation of the circuit of Figure 3 is essentially the same as that of the circuit of Figure 1. By the application of a negative input pulse 27, a positive voltage is eventually applied to the emitter 13 which carries the circuit into its regenerative state. Again a comparatively large output pulse is developed across the output transformer 41 which may be obtained from output terminals 34, in response to an interrogating pulse 32 applied during the time $t_2$.

In the circuits of Figures 1 and 3 the external emitter resistance must be low. In other words, the resistance of the secondary winding 16 should be small. The value of the base resistor 15 in Figure 1 may be 1,000 ohms or less and the output load resistor 20 may have a resistance of between 100 and 1000 ohms.

Figure 4:
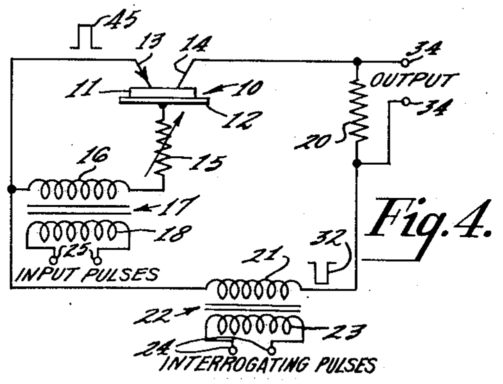
Figure 4 is a circuit diagram of a preferred pulse memory circuit in accordance with the present invention which may be operated as an inhibited circuit.

The circuit of Figure 4 to which reference is now made is a modification of the memory circuit of Figure 1. The circuit of Figure 4 is a preferred embodiment of the present invention. The secondary winding 16 of the input transformer 17 is again connected in series with the base resistor 15 between base 12 and emitter 13. The input pulses are applied to the input terminals 25 connected to the primary winding 18 of input transformer 17. The output load resistor 20 is connected in series with the secondary winding 21 of the transformer 22 between collector 14 and emitter 13. The interrogating pulses 32 may be impressed on the input terminals 24 connected to the primary winding 23 of transformer 22.

The circuit of Figure 4 may be operated in the same manner as is the circuit of Figure 1. However, it is also feasible to operate the circuit of Figure 4 as well as those of Figures 1 and 3 in such a manner as to obtain an inhibited circuit. To this end, the circuit of Figure 4 is adjusted in such a manner as to be normally regenerative, that is, the circuit is regenerative in the absence of an input pulse. In other words, the circuit is adjusted in the manner previously explained by adjustment, for example, of the base resistor 15 and of the bias voltages if any are applied, so that, in the absence of an input pulse, a comparatively large output pulse is developed across the load resistor 20 in response to an interrogating pulse 32.

Figure 5:
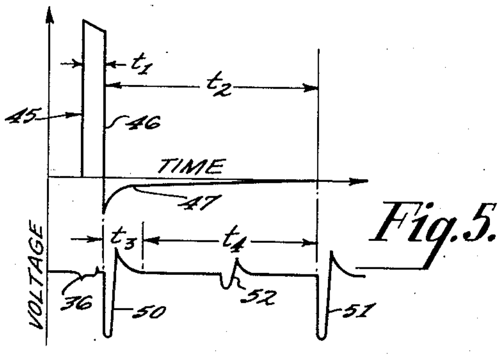
Figure 5 is a graph illustrating the input and output voltages derived from the inhibited circuit of Figure 4 plotted as a function of time.

By the application of an input pulse between emitter 13 and base 12 is is possible to carry the circuit of Figure 4 out of the regenerative state so that a comparatively small output pulse is obtained in response to an interrogating pulse. This mode of operation may be explained by reference to Figure 5. A positive input pulse 45 is now applied across the secondary winding 16 of the input transformer. In the same manner as previously explained, after the occurrence of the trailing edge 46 of the input pulse, a negative voltage indicated at 47 is developed across the secondary winding 16 which is impressed on the emitter 13.

This negative voltage 47 will exist for an interval of time $t_2$ which may be calculated in the same manner as previously explained. The time constant $t_1$ is now determined by $KL/R_2$, where $R_2$ is the resistance which appears looking into emitter 13 when the emitter to base path is biased in the forward direction. The time interval $t_2$ is determined by $KL/R_1$, where $R_1$ is the resistance which appears looking into the emitter when a negative or reverse voltage is impressed between emitter and base. Consequently, the time interval $t_2$ will be much shorter than when the transistor is operated so that a positive voltage is applied to the emitter. However, since $t_2=KL/R_1$, it is possible by careful adjustment of the circuit to increase $t_2$, the inhibiting memory, by the factor K.

It should be noted that during time interval $t_3$ the transistor remains in its regenerative state. This mode of operation of the memory circuit of the invention has been explained in applicant's copending application previously referred to. Thus, when a positive input pulse 47 is applied to the emitter, holes are injected through emitter 13 into the crystal 11. These holes will exist for a certain length of time which depends on the geometry of the transistor and on the properties of the crystal 11. After this interval of time $t_3$, which may be of the order of 15 microseconds, the holes are dissipated either by diffusion or migration or by recombination with electrons.

Consequently, when an interrogating pulse is applied during the time interval $t_3$, a large output pulse indicated at 50 is developed across the load resistor 20. A similarly large output pulse 51 is obtained when the interrogating pulse is applied outside of the time interval $t_2$. However, if the interrogating pulse is applied during the time interval $t_4$, that is after the termination of the interval $t_3$ and before the termination of the interval $t_2$, a comparatively small output pulse 52 is developed across the load resistor. Accordingly, if the circuit of Figure 4 is operated in the manner just outlined, the circuit will inhibit the development of a large output pulse across the load resistor during a predetermined interval of time $t_4$. It will be obvious that the circuits of Figures 1 and 3 may also be operated in the same manner.

Figure 6:
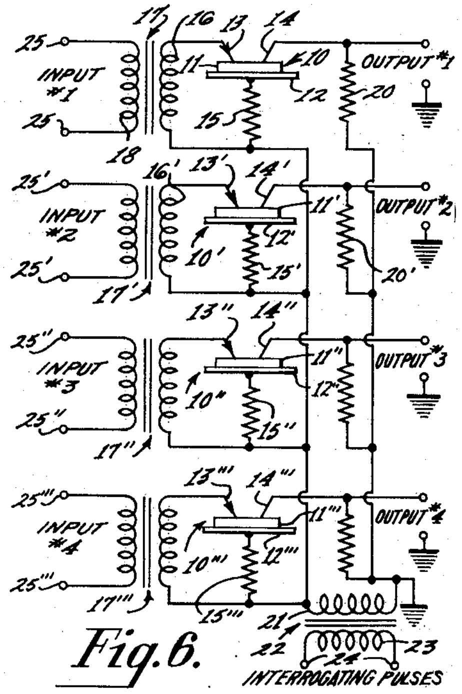
Figure 6 is a circuit diagram of a multiple pulse storage system in accordance with the present invention.

As illustrated in Figure 6, it is also feasible to utilize the memory circuit of the invention for storing a plurality of input signals in a corresponding number of memory circuits and to interrogate all the memory circuits simultaneously. By way of example four input signals have been shown in Figure 6, each of which is applied to a separate memory circuit of the type illustrated in Figure 1. The elements of the circuits to which input signals Nos. 2, 3 and 4 are applied have been designated by corresponding reference numerals provided with a prime, double prime and triple prime respectively. The junction points between base resistor 15 and secondary winding 16, base resistor 15' and secondary winding 16' and so on are connected together to one terminal of the secondary winding 21, the other terminal of which is grounded. Thus, the interrogating pulses are applied simultaneously through secondary winding 21 between collector 14 and base 12 or collector 14' and base 12' and so on of all the circuits. The output resistors 20, 20' and so on have one terminal connected to their respective collector 14, 14' and so on while the other terminal is grounded.

The multiple channel storage circuit of Figure 6 may, for example, be utilized to feed separate input signals either simultaneously or in succession to the inputs Nos. 1, 2 and so on through transformers 17, 17' and so forth. In response to an interrogating pulse being applied to all the circuits simultaneously the output signals obtained from output terminals 34, 34' and so on will occur simultaneously with uniform amplitudes. Thus, the signals or pulses stored on a magnetic tape may be impressed on the input terminals of the channel storage circuit from which they are derived simultaneously in response to an interrogating pulse. It is also feasible to impress the input signals simultaneously on the inputs Nos. 1, 2 . . . and to interrogate each circuit individually by providing separate transformers 22 to each circuit to derive the stored signals in succession.

There have thus been disclosed pulse memory circuits which utilize a current multiplication transistor. The transistors may be operated without applying any direct current voltages. The circuit is able to determine whether or not an input pulse has previously been impressed thereon within a predetermined interval of time which may be of the order of 7,000 microseconds. It is also feasible to operate the memory circuit of the invention as an inhibited circuit which will prevent the development of a large output pulse in response to an interrogating pulse. Furthermore, it is feasible to provide multiple channel storage of input pulses applied for storage in succession and to derive the output signals simultaneously in response to an interrogating pulse.

What is claimed is:

1. A pulse memory circuit comprising a current multiplication transistor including a semi-conducting body, a base electrode, an emitter electrode and a collector electrode in contact with said body, a first impedance element effectively coupling said emitter and collector electrodes, an input inductor effectively connected between said emitter and base electrodes, and providing a time constant network together with the resistance which appears looking into said emitter, an output second impedance element effectively connected between said collector and base electrodes, means for applying an input pulse to said inductor having a predetermined polarity,, whereuon a voltage of opposite polarity and smaller amplitude is developed across said inductor after the occurrence of the trailing edge of said input pulse, and means for applying interrogating pulses between said collector and base electrodes of a polarity to bias said collector and base electrodes in the reverse direction, whereby an output pulse of predetermined amplitude is developed across said second impedance element in response to an interrogating pulse occurring substantially within the duration of said voltage of opposite polarity and an output pulse of a different amplitude is developed across said second impedance element in response to an interrogating pulse occurring at a time outside of the duration of said voltage of opposite polarity.

2. A pulse memory circuit comprising a current multiplication transistor including a semi-conducting body, a base electrode, an emitter electrode and a collector electrode in contact with said body, a first impedance element effectively coupling said emitter and collector electrodes, an input inductor effectively connected between said emitter and base electrodes, and providing a time constant network together with the resistance which appears looking into said emitter, an output second impedance element effectively connected between said collector and base electrodes, means for applying an input pulse to said inductor having a polarity to bias said emitter and base electrodes in the reverse direction, whereupon a voltage of opposite polarity and smaller amplitude is developed across said inductor after the occurrence of the trailing edge of said input pulse, said voltage of opposite polarity biasing said emitter and base electrodes in the forward direction, said first impedance element being adjusted so as to render said transistor regenerative for the duration of said voltage of opposite polarity, and means for applying interrogating pulses between said collector and base electrodes of a polarity to bias said collector and base electrodes in the reverse direction, whereby an output pulse of predetermined large amplitude is developed across said second impedance element in response to an interrogating pulse occurring within the duration of said voltage of opposite polarity and an output pulse of small amplitude is developed across said second impedance element in response to an interrogating pulse occurring at a time outside of the duration of said voltage of opposite polarity.

3. A pulse memory circuit comprising a current multiplication transistor including a semi-conducting body, a base electrode, an emitter electrode and a collector electrode in contact with said body, a first impedance element effectively coupling said emitter and collector electrodes, an input transformer having a secondary winding effectively connected between said emitter and base electrodes, and providing a time constant network together with the resistance which appears looking into said emitter, an output second impedance element effectively connected between said collector and base electrodes, means for applying an input pulse to said input transformer having a polarity to bias said emitter and base electrodes in the reverse direction, whereupon a voltage of opposite polarity and smaller amplitude is developed across said secondary winding after the occurrence of the trailing edge of said input pulse, said voltage of opposite polarity biasing said emitter and base electrodes in the forward direction, said first impedance element being adjusted so as to render said transistor regenerative for the duration of said voltage of opposite polarity, and means for applying interrogating pulses between said collector and base electrodes of a polarity to bias said collector and base electrodes in the reverse direction, said pulses being the sole sources of potential of said transistor, whereby an output pulse of predetermined large amplitude is developed across said second impedance element in response to an interrogating pulse occurring within the duration of said voltage of opposite polarity and an output pulse of small amplitude is developed across said second impedance element in response to an interrogating pulse occurring at a time outside of the duration of said voltage of opposite polarity.

4. A pulse memory circuit as defined in claim 3 wherein said input transformer is a wide band transformer having a relatively high magnetic coupling between its primary and secondary windings, whereby the leakage reactance is low, and wherein the inductance of said secondary winding is relatively large.

5. A pulse memory as defined in claim 3 wherein said first impedance element is a resistor.

6. A pulse memory as defined in claim 3 wherein said first impedance element is connected directly between said emitter and collector electrodes.

7. A pulse memory circuit as defined in claim 3 wherein said first impedance element is connected serially with said secondary winding between said base and emitter electrodes.

8. A pulse memory circuit comprising a current multiplication transistor including a semi-conducting body, a base electrode, an emitter electrode and a collector electrode in contact with said body, a first impedance element and an input inductor forming a first series connection and effectively connected between said emitter and base electrodes, and providing a time constant network together with the resistance which appears looking into said emitter, an output second impedance element, and a third impedance element forming a second series connection and effectively connected between said collector electrode, and said first series connection, means for applying an input pulse to said inductor having a polarity to bias said emitter and base electrodes in the reverse direction, whereupon a voltage of cpposite polarity and smaller amplitude is developed across said inductor after the occurrence of the trailing edge of said input pulse, said voltage of opposite polarity biasing said emitter and base electrodes in the forward direction, said first impedance element being adjusted so as to render said transistor regenerative for the duration of said voltage of opposite polarity, and means for applying interrogating pulses to said third impedance element of a polarity to bias said collector and base electrodes in the reverse direction, said pulses being the sole sources of potential of said transistor, whereby an output pulse of predetermined large amplitude is developed across said second impedance element in response to an interrogating pulse occurring within the duration of said voltage of opposite polarity and an output pulse of small amplitude is developed across said second impedance element in response to an interrogating pulse occurring at a time outside of the duration of said voltage of opposite polarity.

9. A pulse memory circuit as defined in claim 8 wherein said first impedance element is a resistor.

10. A pulse memory circuit as defined in claim 8 wherein said second series connection is connected between said collector electrode and the junction between said first impedance element and said input inductor.

11. A pulse memory circuit as defined in claim 8 wherein said second series connection is connected directly between said collector and emitter electrodes.

12. A multiple pulse storage system comprising a plurality of pulse memory circuits, each including a current multiplication transistor having a semi-conducting body, a base electrode, an emitter electrode and a collector electrode in contact with said body, a first impedance element effectively coupling said emitter and collector electrodes, an input inductor effectively connected between said emitter and base electrodes, and providing a time constant network together with the resistance which appears looking into said emitter, and an output second impedance element effectively connected between said collector and a point of substantially fixed potential; means for applying individually an input pulse of predetermined polarity to each of said inductors whereby a voltage of opposite polarity and smaller amplitude is developed across each inductor after the occurrence of the trailing edge of said input pulse, and means for applying simultaneously an interrogating pulse between the collector and base electrodes of each transistor of a polarity to bias each collector and its associated base electrode in the reverse direction, whereby an output pulse of predetermined amplitude is developed across each of said second impedance elements in response to an interrogating pulse.

13. A multiple pulse storage system comprising a plurality of pulse memory circuits, each including a current multiplication transistor having a semi-conducting body, a base electrode, an emitter electrode and a collector electrode in contact with said body, a first impedance element effectively coupling said emitter and collector electrodes, an input inductor effectively connected between said emitter and base electrodes, and providing a time constant network together with the resistance which appears looking into said emitter, and an output second impedance element effectively connected between said collector and a point of substantially fixed potential; means for applying individually and at random an input pulse to each of said inductors to bias the associated emitter and base electrodes in the reverse direction whereby a voltage of opposite polarity and smaller amplitude is developed across each inductor after the occurrence of the trailing edge of said input pulse to bias said associated emitter and base electrodes in the forward direction and means for applying simultaneously an interrogating pulse between the collector and base electrodes of each transistor of a polarity to bias each collector and associated base electrodes in the reverse direction, whereby an output pulse of predetermined large amplitude is developed across each of said second impedance elements in response to an interrogating pulse occurring within a predetermined interval of time from said input pulses.

14. An inhibited pulse memory circuit comprising a current multiplication transistor including a semi-conducting body, a base electrode, an emitter electrode and a collector electrode in contact with said body, a first impedance element effectively coupling said emitter and collector electrodes, an input inductor effectively connected between said emitter and base electrodes, and providing a time constant network together with the resistance which appears looking into said emitter, means for applying an input pulse to said input inductor having a polarity to bias said emitter and base electrodes in the forward direction, whereupon a voltage of opposite polarity and smaller amplitude is developed across said inductor after the occurrence of the trailing edge of said input pulse to bias said emitter and base electrodes in the reverse direction, said first impedance element being adjusted so as to render said transistor regenerative for the duration of said input pulse and non-regenerative for a predetermined portion of the duration of said voltage of opposite polarity, and means for applying interrogating pulses between collector and base electrodes of a polarity to bias said collector and base electrodes in the reverse direction, whereby an output pulse of predetermined small amplitude is developed across said second impedance element in response to an interrogating pulse occurring substantially within said predetermined portion of the duration of said voltage of said opposite polarity and an output pulse of large amplitude is developed across said second impedance element in response to an interrogating pulse occurring substantially outside of the duration of said voltage of opposite polarity.

15. An inhibited pulse memory circuit comprising a current multiplication transistor including a semi-conducting body, a base electrode, an emitter electrode and a collector electrode in contact with said body, a first impedance element effectively coupling said emitter and collector electrodes, an input transformer having a secondary winding effectively connected between said emitter and base electrodes and providing a time constant network together with the resistance which appears looking into said emitter, means for applying an input pulse to said transformer having a polarity to bias said emitter and base electrodes in the forward direction, whereupon a voltage of opposite polarity and smaller amplitude is developed across said secondary winding after the occurrence of the trailing edge of said input pulse to bias said emitter and base electrodes in the reverse direction, said first impedance element being adjusted so as to render said transistor regenerative for the duration of said input pulse and non-regenerative for a predetermined period of time beginning a predetermined instant after the occurrence of said trailing edge and for the remainder of the duration of said voltage of opposite polarity, and means for applying interrogating pulses between collector and base electrodes of a polarity to bias the collector and base electrodes in the reverse direction, said pulses being the sole sources of potential of transistors, whereby an output pulse of predetermined small amplitude is developed across said second impedance element in response to an interrogating pulse occurring substantially during said predetermined period of time and an output pulse of large amplitude is developed across said second impedance element in response to an interrogating pulse occurring substantially outside of said predetermined period of time.

JOHN B. GEHMAN.

References Cited in the file of this patent

UNITED STATES PATENTS

| Number | Name | Date |
|---|---|---|
| 2,569,345 | Shea | Sept. 25, 1951 |
| 2,591,961 | Moore | Apr. 8, 1952 |
| 2,594,449 | Kircher | Apr. 29, 1952 |
| 2,620,448 | Wallace | Dec. 2, 1952 |
| 2,622,211 | Trent | Dec. 16, 1952 |
| 2,623,170 | Dickinson | Dec. 23, 1952 |
| 2,627,039 | MacWilliams | Jan. 27, 1953 |

OTHER REFERENCES

The Transister. Bell Telephone Labs., pp. 627–686. "Computers Using Transisters." by J. H. Felker.

Electrical Engr., pp. 1103–1108, December 1952.